US011003518B2

(12) United States Patent
Lopez et al.

(10) Patent No.: US 11,003,518 B2
(45) Date of Patent: May 11, 2021

(54) COMPONENT FAILURE PREDICTION

(71) Applicant: Hewlett-Packard Development Company, L.P., Spring, TX (US)

(72) Inventors: Marlon Gomes Lopez, Vancouver, WA (US); Guilherme Selau Riberio, Porto Alegre (BR); Luciano Alves, Porto Alegre (BR); Humberto Cardoso Marchezi, Porto Alegre (BR); Brian Schmitz Tani, Porto Alegre (BR); Leonardo Marquezini, Porto Alegre (BR); Eduardo Rodel, Porto Alegre (BR); Josepe Franco Gerent, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 120 days.

(21) Appl. No.: 16/334,857

(22) PCT Filed: Sep. 29, 2016

(86) PCT No.: PCT/US2016/054371
§ 371 (c)(1),
(2) Date: Mar. 20, 2019

(87) PCT Pub. No.: WO2018/063225
PCT Pub. Date: Apr. 5, 2018

(65) Prior Publication Data
US 2020/0026590 A1  Jan. 23, 2020

(51) Int. Cl.
*G06F 11/00* (2006.01)
*G06N 20/00* (2019.01)
(Continued)

(52) U.S. Cl.
CPC ........ *G06F 11/008* (2013.01); *G05B 19/4065* (2013.01); *G05B 23/0243* (2013.01);
(Continued)

(58) Field of Classification Search
CPC ... G06F 11/008; G06F 11/3075; G06N 20/00; G05B 19/4065; G05B 23/0243; G05B 2219/32201; G05B 23/024
(Continued)

(56) References Cited

U.S. PATENT DOCUMENTS 7,225,109 B2 *  5/2007  Frerichs ................. G01H 17/00
                                                        702/185
7,324,909 B2    1/2008  Yasukawa et al.
(Continued)

FOREIGN PATENT DOCUMENTS

CN          104034794          1/2014

OTHER PUBLICATIONS

Hitachi ~ Anomaly Detection Solutions for Improved Equipment Availability, Sep. 15, 2015, https://www.hitachi.com.au/~6 pages.

*Primary Examiner* — Yair Leibovich
(74) *Attorney, Agent, or Firm* — Brooks Cameron & Huebsch PLLP

(57) ABSTRACT

Example systems may relate to component failure prediction. A non-transitory computer readable medium may contain instructions to analyze a plurality of features corresponding to a component of a system. The non-transitory computer readable medium may further contain instructions to determine which of the plurality of features to use to model a failure of the component. The non-transitory computer readable medium may contain instructions to generate a plurality of models to model the failure of the component and assemble the plurality of models into a single model for predicting component failure. The non-transitory computer
(Continued)

readable medium may further contain instructions to extract data associated with a component failure predicted by the single model and correlate the data associated with the predicted component failure with the single model.

15 Claims, 4 Drawing Sheets

(51) Int. Cl.
*G05B 19/4065* (2006.01)
*G05B 23/02* (2006.01)
*G06F 11/30* (2006.01)

(52) U.S. Cl.
CPC ......... *G06F 11/3075* (2013.01); *G06N 20/00* (2019.01); *G05B 2219/32201* (2013.01)

(58) Field of Classification Search
USPC ......................................................... 714/47.1
See application file for complete search history.

(56) References Cited

U.S. PATENT DOCUMENTS

| | | |
|---|---|---|
| 7,696,866 B2 | 4/2010 | Horvitz |
| 7,730,364 B2 | 6/2010 | Chang et al. |
| 8,988,236 B2 | 3/2015 | Liu et al. |
| 9,091,990 B2 | 7/2015 | Imazeki et al. |
| 2005/0283511 A1 | 12/2005 | Fan et al. |
| 2008/0059120 A1 | 3/2008 | Xiao et al. |
| 2010/0223213 A1 | 9/2010 | Su et al. |
| 2013/0024173 A1* | 1/2013 | Brzezicki ................ G06F 30/20 703/6 |
| 2014/0180651 A1 | 6/2014 | Lysak et al. |
| 2015/0227838 A1 | 8/2015 | Wang et al. |

* cited by examiner

COMPONENT FAILURE PREDICTION

BACKGROUND

Electromechanical products may be made up of multiple components. When a component fails, it may be time-consuming to fix. Additionally, skilled labor may be required to determine the root cause of the failure. While many components are equipped with sensors to monitor the health of the component, the data obtained by the sensor may be unstructured and difficult to analyze.

DETAILED DESCRIPTION

Figure 1:
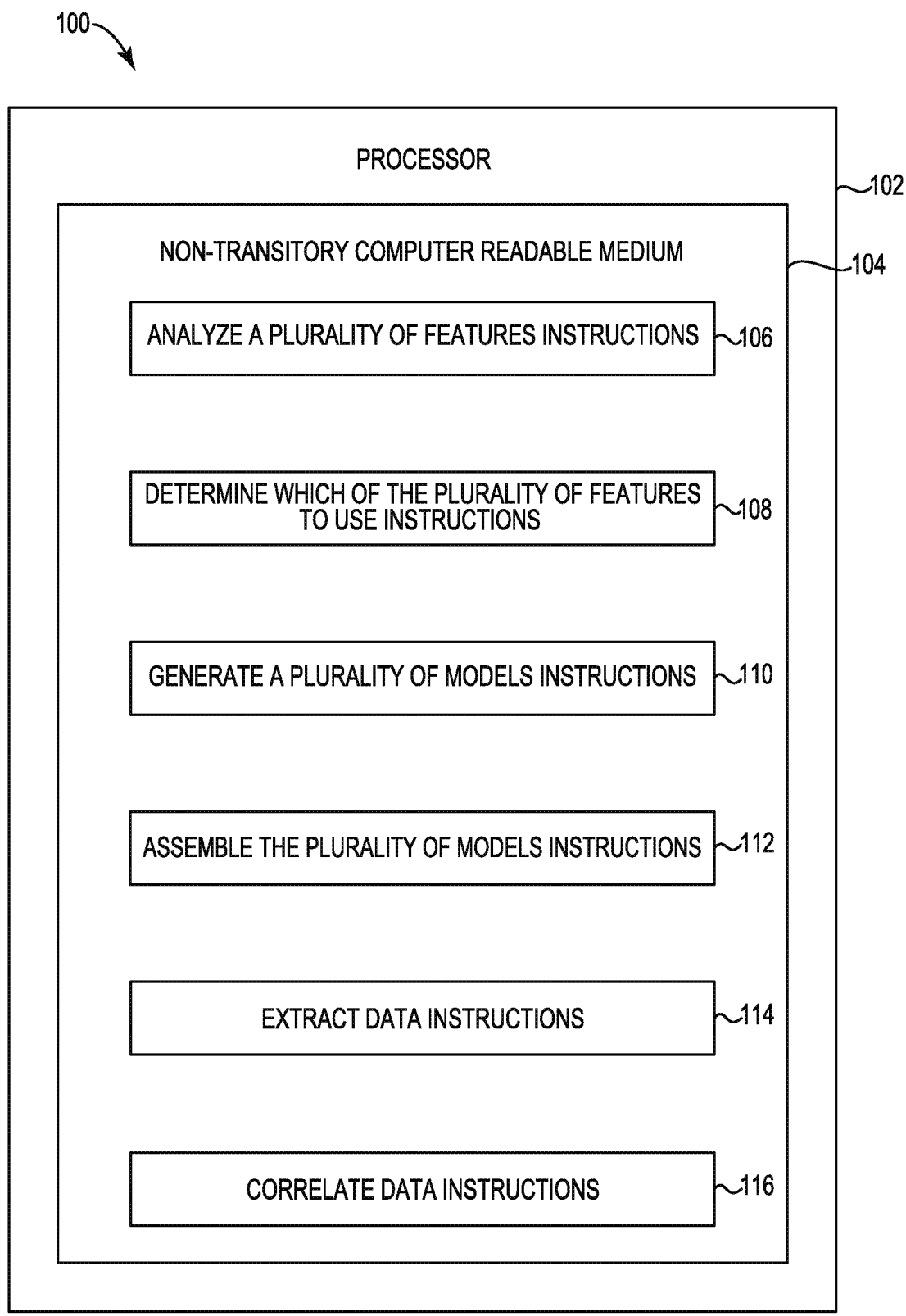
FIG. 1 is an example system for component failure prediction according to the present disclosure.

Electromechanical products may be made up of multiple components. As used herein, an electromechanical product refers to a product using both electrical and mechanical parts, such as printers. The status of each component may be monitored by at least one sensor. The sensor may record numerical data to serve as a historical data record for the component. When a component fails, the sensor may note the failure as part of the historical data record. This may allow a user to determine exactly when the component failed and what caused the failure. The component may then be replaced and the product is able to continue working.

However, waiting to replace a component until the component has failed presents challenges to both a user and the product's servicer. Failure of a vital component may cause the entire electromechanical product to be offline until the component is replaced, meaning the user is unable to complete any work requiring the product. Additionally, components may be difficult to send on short notice.

By contrast, if a component's failure can be predicted, both the user and the product servicer can take steps to minimize the impact that replacing a component will have. For instance, the user and the product servicer may coordinate to replace the component at a time when the product is able to be offline without causing serious disruption to the user. The product servicer may also be able to arrange more cost-effective transport of the replacement component. In addition, the product servicer may be able to replace multiple components in one visit, further reducing the impact of any future component failures.

Since sensors associated with components only create historical data records for the component, the sensors are not able to predict a component's failure. To predict failure, a model may need to be constructed for each component. The model may utilize the historical data record compiled by the sensor to predict when a component may fail based on past performance and past failures.

A separate model may be used for each component in a product. Therefore, in a complex product with many components, the number of models used can quickly become quite large. Many of the models may be implemented and evaluated; as such, with a relatively large number of models, it may take time to implement and update each model according to evaluations done after a component failure.

Component failure prediction according to the present disclosure may be more automated and require less input and manual implementation compared to previous systems. As a result, models may be generated without a user having to input new data. Additionally, component failure prediction according to the present disclosure may include automatic analysis and evaluation of the success of a model. Therefore, a model may be automatically updated or trained based on the results of the automatic evaluation, instead of being updated when a user is able to do an evaluation. This may allow for more accurate models to be generated without a user adding additional input data.

FIG. 1 is an example system 100 for component failure prediction according to the present disclosure. As shown in FIG. 1, system 100 may include multiple components. For example, system 100 may include a processor 102 and a non-transitory computer-readable storage medium 104. Although the following descriptions refer to a single processor and a single computer readable storage medium, the descriptions may also apply to a system with multiple processors and multiple computer readable storage mediums. In such examples, the instructions may be distributed (e.g., stored) across multiple computer readable storage mediums and the instructions may be distributed (e.g., executed by) across multiple processors.

Processor 102 may be a central processing unit (CPU), a semiconductor based microprocessor, and/or other hardware devices suitable for retrieval and execution of instructions stored in computer-readable storage medium 104. Processor 102 may fetch, decode, and execute instructions 106, 108, 110, 112, 114, 116, or a combination thereof. As an alternative or in addition to retrieving and executing instructions, processor 102 may include at least one electronic circuit that includes electronic components for performing the functionality of instructions 106, 108, 110, 112, 114, 116, or a combination thereof.

Computer readable storage medium 104 may be any electronic, magnetic, optical, or other physical storage device that stores executable instructions. Thus, computer readable storage medium 104 may be, for example, Random Access Memory (RAM), an Electrically-Erasable Programmable Read-Only Memory (EEPROM), a storage drive, an optical disc, and the like. Computer readable storage medium 104 may be disposed within system 100, as shown in FIG. 1. In this situation, the executable instructions may be "installed" on the system 100. Additionally and/or alternatively, computer readable storage medium 104 may be a portable, external or remote storage medium, for example, that allows system 100 to download the instructions from the portable/external/remote storage medium. In this situation, the executable instructions may be part of an "installation package". As described herein, computer readable storage medium 104 may be encoded with executable instructions for component failure prediction.

Referring to FIG. 1, analyze a plurality of features instructions 106, when executed by a processor, such as processor 102, may cause system 100 to analyze a plurality of features of a system. As used herein, a feature refers to a data set generated from the historical data record compiled by the sensor for a component. Each feature may be generated to correspond to a particular part of the component. For instance, one feature may be generated to correspond to overheating of the component, while another feature may be generated to correspond to a mechanical failure of the component.

Analyze a plurality of features instructions 106 may include instructions to determine whether each of the features has successfully predicted a failure of the component. For example, if a feature is generated to correspond to overheating of the component, analyze a plurality of features instructions 106 may determine that the feature has correctly predicted overheating of the component a first number of times in the past. Analyze a plurality of features instructions 106 may also determine that the feature failed to predict overheating of the component a second number of times in the past.

Analyze a plurality of features instructions 106 may further include instructions to calculate a correlation between the feature and the successful prediction of component failure. In some instances, the correlation may be calculated by comparing the total number of failures of the component with the number of failures correctly predicted by the feature. In such examples, a feature that has correctly predicted a higher number of the total failures may have a higher correlation. For example, a feature that correctly predicted five failures out of ten total failures may have a correlation of 0.5, while a feature that correctly predicted eight failures out of ten total failures may have a correlation of 0.8.

Analyze a plurality of features instructions 106 may further include instructions to determine a rate at which each of the plurality of features has failed to successfully predict a component failure. A feature that has failed to successfully predict multiple component failures may be determined to have a higher failure rate than a feature that has failed to successfully predict only a few component failures. For example, a feature that failed to predict five failures out of ten total failures may have a failure to predict rate of 50%, while a feature that failed to predict two failures out of ten total failures may have a failure to predict rate of 20%.

Determine which of the plurality of features to use instructions 108, when executed by a processor such as processor 102, may cause processor 102 to select a plurality of analyzed features to use to model a failure of a component. Determine which of the plurality of features to use instructions 108 may include instructions to determine a quantity of features to be used to model a failure of a component. A particular type of failure may require a certain number of features to be used in order to accurately model the failure. Determine which of the plurality of features to use instructions 108 may determine what the number of features required for accurate modeling of a particular type of failure is. For example, determine which of the plurality of features to use instructions 108 may determine that five total features are needed to accurately model overheating failure of a particular component. However, examples are not so limited and any number of features may be determined.

Determine which of the plurality of features to use instructions 108 may further include instructions to select a subset of the plurality of features. In some examples, the subset of features may be selected based on the analysis done at 106. For example, features that have a correlation between the feature and the successful prediction of component failure that is above a threshold correlation may be selected, while features that have a correlation below the threshold may be discarded. Features with a correlation above the threshold correlation may further be ranked based on their correlation. Features with higher correlations may be ranked ahead of features with lower correlations. Determine which of the plurality of features to use instructions 108 may then select the features to use based on the ranking.

In other examples, determine which of the plurality of features to use instructions 108 may select the subset of features based on the determined rate at which each feature has failed to successfully predict component failure. For example, features with a failure rate above a threshold failure rate may be discarded, while features with a failure rate below the threshold failure rate may be selected. Determine which of the plurality of features to use instructions 108 may further rank the failure rates. In some examples, determine which of the plurality of features to use instructions 108 may select a subset of features based on both the correlation to successful prediction of component failure and the rate at which the each of the plurality of features has failed to successfully predict component failure.

Generate a plurality of models instructions 110, when executed by a processor such as processor 102, may cause processor 102 to generate a plurality of models to model the failure of a component. As used herein, a model refers to a mathematical tool used to predict an event. The event may be a component failure or a component degradation.

Generate a plurality of models instructions 110 may utilize the features selected at 108 to generate the models. In some examples, each of the plurality of models generated may correspond to a particular type of failure. For example, a model may use features corresponding to overheating failures of a component to predict an overheat failure of the component. Generate a plurality of models instructions 110 may further generate more than one model directed to predicting the same event. In such examples, each of the models may be generated using different features, allowing for a variety of ways to predict a particular type of failure.

Assemble the plurality of models instructions 112, when executed by a processor such as processor 102, may cause processor 102 to combine the plurality of models generated at 110 into a single model. The single model may be designed to predict a specific event or failure. In some examples, processor 102 may determine a range of failures that a particular component is likely to experience. As used herein, a range of failures refers to several types of failures likely to be experienced by a component based on the component's make-up. Based on the determined range of failures, assemble the plurality of models instructions 110 may then combine models into a single model to predict the range of failures.

In some examples, the single model may be assembled to allow the single model to predict multiple types of failures. For example, if Model A represents the best model for predicting component failure due to overheating and Model B represents the best model for predicting component failure due to degradation, assemble the plurality of models instructions 112 may combine Models A and B into a third, single model that is able to predict both overheating and degradation failures.

The plurality of models may be assembled into a single model using a variety of techniques. In one example, each of the models may be trained using data representing a subsample of the original data used to generate the model. Using the training data, an output may be generated for each model. The outputs may then be averaged to produce a single model. The outputs may also be voted on to produce a single model In another example, models may be iteratively trained using training data. In each iteration, a model may learn where the previous iteration had errors, and use that information to improve. Each model may be weighted based on accuracy and added to a classifier. When a new model is added to the classifier, the models that were already added may be reweighted to account for the new model. In this way, processor 102 is able to determine which models are the strongest and which are the weakest, and combine the models into the single model based on that determination. In some examples, models may be combined by chaining outputs generated by using the training data. In some examples, models may be combined by voting on the outputs or by using a weighted sum of the outputs.

In another example, models may be trained using training data. Using the training data, each model may produce an output. As used herein, an output refers to a result of a model. In some examples, an output may be a prediction. The output may then be sent to a higher order model. The higher order model serves to analyze the outputs and determine how best to combine the models that produced the output to account for a range of component failures. Based on the results from the higher order model, processor 102 may combine those models identified as those that, combined, will produce accurate results.

The single model assembled at 112 may be used to predict a failure of a corresponding component. When the model determines that the component is likely to fail, an alert may be transmitted, signaling that the component is predicted to fail. When the alert is transmitted, the alert may be accepted and service may be scheduled. Alternatively, the alert may be ignored.

Once a component has failed, extract data instructions 114 may cause a processor, such as processor 102, may cause the processor to extract data associated with the component. In some examples, the component failure may have been predicted by the single model. The data extracted may include data indicating the time at which the component failed and what caused the component to fail. For example, in the case of an overheating failure, the extracted data may include the time at which the component stopped working and the temperature at which the component failed.

Correlate data instructions 116, when executed by a processor such as processor 102, may cause the processor to correlate the data extracted at 114 with the single model. In some examples, correlating the data may include determining that the model accurately predicted the component failure. This may include determining that the model accurately predicted the time at which the component would fail and/or the cause of the failure. In some examples, correlating the data may include determining that the model did predict that a failure would occur but did not do so accurately. For example, the model may have predicted that the component would fail at a different time or for a different reason. In some examples, correlating the data may include determining that the model failed to predict a failure of the component. By correlating the data with the models, system 100 may be able to learn which models are more accurate at predicting component failure and can thus further refine the models.

Figure 2:
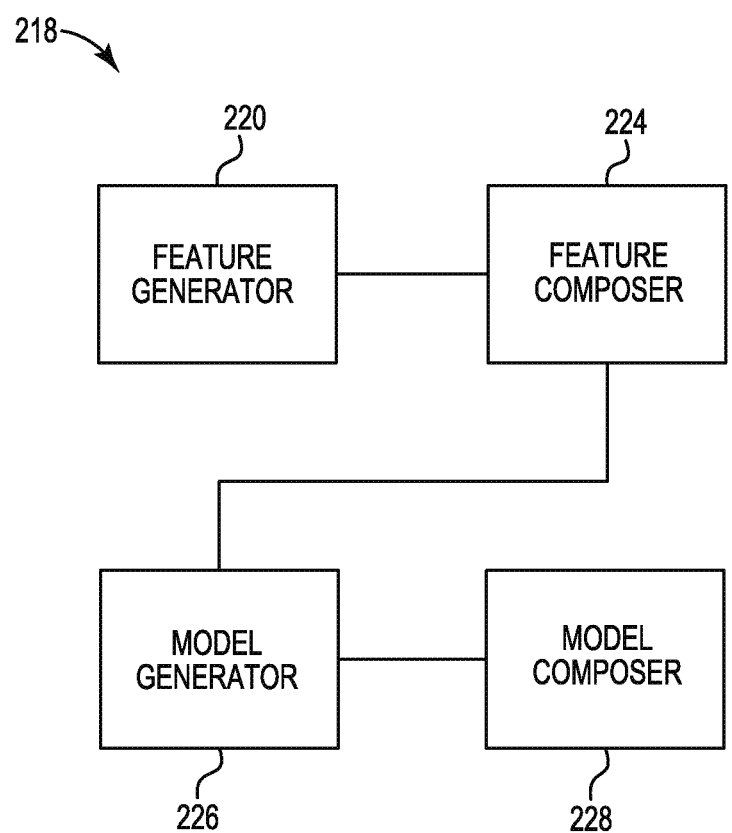
FIG. 2 is an example system for component failure prediction according to the present disclosure.

FIG. 2 is an example system 218 for component failure prediction according to the present disclosure. As shown in FIG. 2, system 218 may include multiple components. System 218 may include a feature generator 220. As used herein, a feature generator refers to instructions to generate a plurality of features. Feature generator 220 may generate features based on data extracted from sensors monitoring components of an electromechanical product. As described previously, each of the features generated by feature generator 220 may correspond to a particular component or to a particular part of the component.

System 218 may further include a feature composer 224. As used herein, a feature composer refers to instructions to determine which features generated by feature generator 220 to use in modeling. Feature composer 224 may first analyze the plurality of features generated by feature generator 220. As described above, the plurality of generated features may be analyzed using multiple methods. In some examples, feature composer 224 may analyze the features by determining whether each of the features has successfully predicted a failure of the component. In some examples, feature composer 223 may analyze each feature by calculating a correlation between the feature and the successful prediction of component failure. As described above, the correlation may be calculated by comparing the total number of failures of the component with the number of failures correctly predicted by the feature.

Feature composer 224 may further select a plurality of the analyzed features to use. As described above, features may be selected based on the result of the analysis. For example, if feature composer 224 has analyzed the generated features by determining whether the feature has successfully predicted a component failure, feature composer 224 may select features which have been determined to be successful.

In some examples, feature composer 224 may calculate a correlation between a generated feature and the successful prediction of the component failure. Feature composer 224 may then determine that a feature has a correlation to a failure that is below a threshold correlation. Feature composer 224 may then discard the feature based on this determination, thus removing the feature from consideration for future use. Feature composer 224 may further determine that a feature has a correlation to a failure that is above a threshold correlation. Based on this determination, feature composer 224 may keep the feature, allowing the feature to remain in consideration for future use.

System 216 may include a model generator 226. As used herein, a model generator refers to machine readable instructions to generate a plurality of models using features. In some examples, model generator 226 may use the features selected by feature composer 224 to generate the models. As described above, each model may be generated using features that correspond to a type of component failure.

Model generator 226 may also refine the generated models. In some examples, model generator 226 may determine a weight value of each of the generated models. As described above, weighting may be based on accuracy of a model that has been trained using training data. Once a generated model has received a weight value, model generator 226 may determine that the weight value of a model is below a threshold weight value, indicating that the model's accuracy is below a threshold. Model generator 226 may then discard the generated model based on the determination, removing it from consideration for use. Model generator 226 may further determine that a model has a weight value above a threshold weight value, indicating that the model's accuracy is above a threshold. Based on the determination that the model's weight is above a threshold value, model generator 226 may retain the model, keeping it in consideration for further use.

System 218 may further include model composer 228. As used herein, a model composer refers to machine readable instructions to assemble a plurality of models into a single model. As described above, the plurality of models may be assembled into a single model using a variety of techniques. For example, each of the models may be trained using data representing a subsample of the original data used to generate the model. Using the training data, an output may be generated for each model. Model generator 228 may receive the outputs from each of the plurality of models. Model generator 228 may then combine the outputs from the plurality of models into a single output. The single output may correspond to a single model that is a combination of the plurality of models. In some examples, model generator 228 may be combine the plurality of outputs by averaging the outputs. Model generator 228 may also combine the plurality of outputs by first weighting the outputs and then ranking the weighted outputs.

In some examples, model generator 228 may determine an aspect of data represented by each of the plurality of models. As used herein, an aspect of data refers to a particular focus of a type of data. For example, certain data may be directed to temperature of a component, while other data may be directed to a mechanical piece of the component. Model generator 228 may then analyze a combination of the plurality of models to determine a coverage of the aspect by the combination of the models. As used herein, a coverage of the aspect of data refers to the degree to which the combination of models addresses the aspect of data. Model generator 228 may then determine that a combination of the plurality of models provides a coverage of the aspect above a threshold coverage. Model generator 228 may then select the combination of the plurality of models based on the determination that the coverage of the combination of the plurality of models is above the threshold coverage.

System 218 may also include a failure extractor. As used herein, a failure extractor refers to machine readable instructions to extract data related to a failure and associate the data to a model. The failure extractor may first determine that a particular component has failed. Once a failure has been determined to have occurred, the failure extractor may extract data corresponding to the failed component. The failure extractor may extract data related to the cause of the failure, the time at which the failure occurred, the events leading up to the failure, and/or the component's characteristics. Once the failure extractor has extracted the data corresponding to the failure, the failure extractor may generate association information for the component. In some examples, generating association information may include determining that the model to predict the component failure predicted the component failure. In some examples, generating association information may include determining which features are associated with the extracted data.

Once the failure extractor has generated association information, the failure extractor may provide the association information to feature generator 220. By providing the association information to feature generator 220, the failure extractor may allow the feature generator to use updated component failure information when generating features. In other words, receiving the association information from the failure extractor may allow feature generator 220 to refine the features it generates and generate features that have closer ties to component failures.

Figure 3:
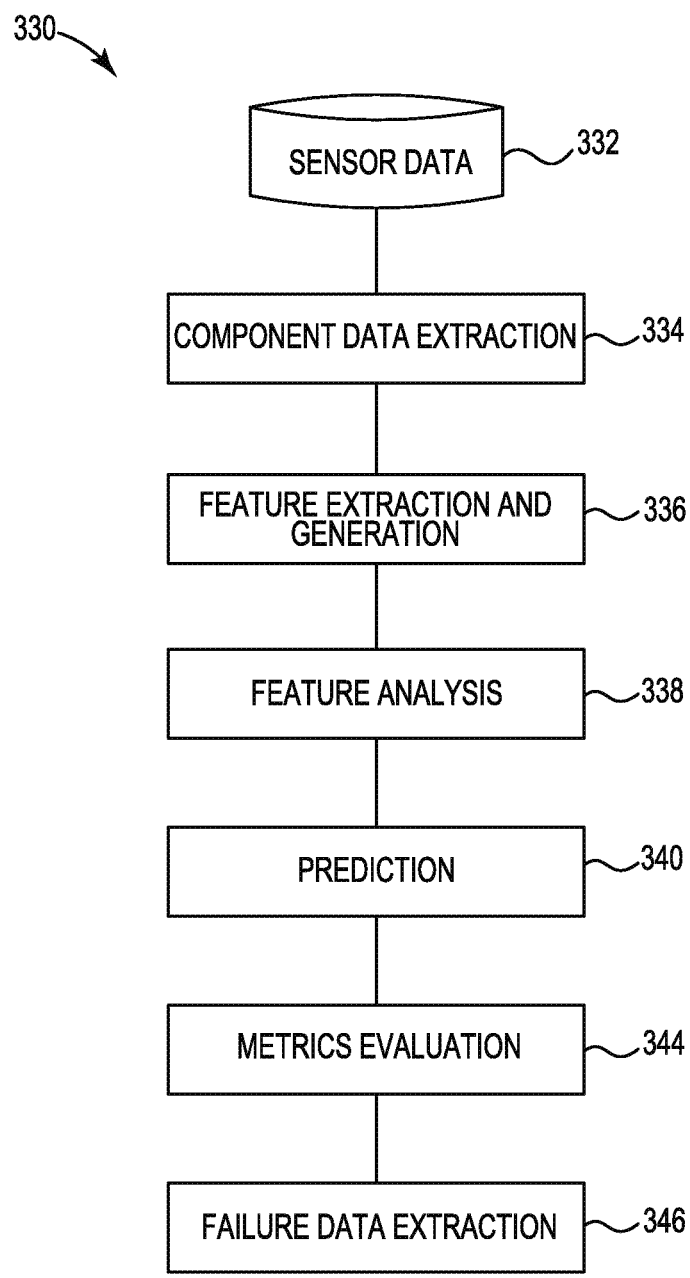
FIG. 3 is an example system for component failure prediction according to the present disclosure.

FIG. 3 is an example system 330 for component failure prediction according to the present disclosure. As shown in FIG. 3, system 330 may include multiple elements. Sensor data 332 may refer to data collected by sensors monitoring components. As described above, sensor data 332 may include numerical data related to a component. Sensor data 332 may take the form of a historical data record showing the performance of the component over time. Sensor data 332 may be extracted at component data extraction 334.

Once component data has been extracted at 334, feature extraction and generation 336 may occur. Feature extraction and generation may be performed by feature generator 220, shown in FIG. 2. Generated features may then under feature analysis 338. Feature analysis 338 may correspond to analyze a plurality of features instructions 106, shown in FIG. 1. Feature analysis 338 may be performed by feature composer 224, shown in FIG. 2. As discussed above, feature analysis 338 may look at the accuracy of a generated feature with respect to a type of component failure. Feature analysis 338 may serve to refine the generated features, allowing those features that are the most accurate to be used to predict component failure.

Prediction 340 may refer to a prediction, based on a model, that a component is likely to fail. The model used to make prediction 340 may be a model assembled by model composer 228, shown in FIG. 2. As discussed above, the model used to make predictions such as prediction 340 may be a single model assembled from a plurality of generated models. In some examples, prediction 340 may include transmitting an alert that the component is predicted to fail.

Upon receiving prediction 340, metrics evaluation 342 may take place. As used herein, metrics evaluation refers to analyzing the overall accuracy of the model used to make prediction 340. Metrics evaluation 342 may involve multiple metrics. In one example, metrics evaluation 342 may comprise using a confusion matrix. As used herein, a confusion matrix refers to a table used to see when true or false positives and negatives correspond to actual values. In a confusion matrix, the rows may represent the actual values, while the columns may represent the predicted values, with the predicted values based on a preselected threshold. Once the positives and negatives are input into the table, the confusion matrix allows for tallying of the number of correctly predicted positives and negatives, as well as for tallying the number of incorrectly predicted positives and negatives.

In some examples, metrics evaluation 342 may utilize proportions to evaluate the accuracy of a model. Metrics evaluation 342 may look at the precision, or positive predictive value, of a model. Precision measures the proportion of true positives, i.e. correctly predicted failures, given all predicted positive results, i.e. correctly and incorrectly predicted failures. Metrics evaluation 342 may further look at the recall, or true positive rate, of a model. Recall measures the proportion of true positive results, i.e. correctly predicted failures, against the results that are actually positive, i.e. failures that were correctly predicted and failures that occurred but were not predicted.

In some examples, metrics evaluation 342 may combine precision and recall into a third measure, known as an F-score. The F-score measures the model's accuracy using both precision and recall for a predetermined threshold. Metrics evaluation 342 may also look at the harmonic mean of the precision and recall, in a measure known as an F-Score.

In some examples, metrics evaluation 342 may look at the rate of false positives of the model. Also known as fall-out, the false positive rate measures the proportion of false positive results, (i.e. an incorrect prediction) against the results that are actually negative, (i.e. no failure). The fall-out may be used by metrics evaluation 342 to graphically analyze the model. In some examples, metrics evaluation 342 may include a Receiver Operating Characteristic (ROC) curve. An ROC curve refers to a graphical plot illustrating the performance of a binary classifier system as its discrimination threshold is varied. An ROC curve is obtained by plotting the recall value against the fall-out, varying the threshold. The accuracy of the model is obtained by calculating the area under the curve of the graph. The closer the area under the curve is to one, the more accurate the model.

Failure data extraction 346 may include extracting data corresponding to the failed component. Failure data extraction 346 may correspond to extract data instructions 114, shown in FIG. 1. Failure data extraction 346 may be performed by a failure extractor as discussed above. As discussed above, failure data extraction 346 may include associating the data with a model. The data exacted at 346 corresponding to the failure may be combined with the metrics evaluation 342 to further refine the features generated to measure sensor data 332.

Figure 4:
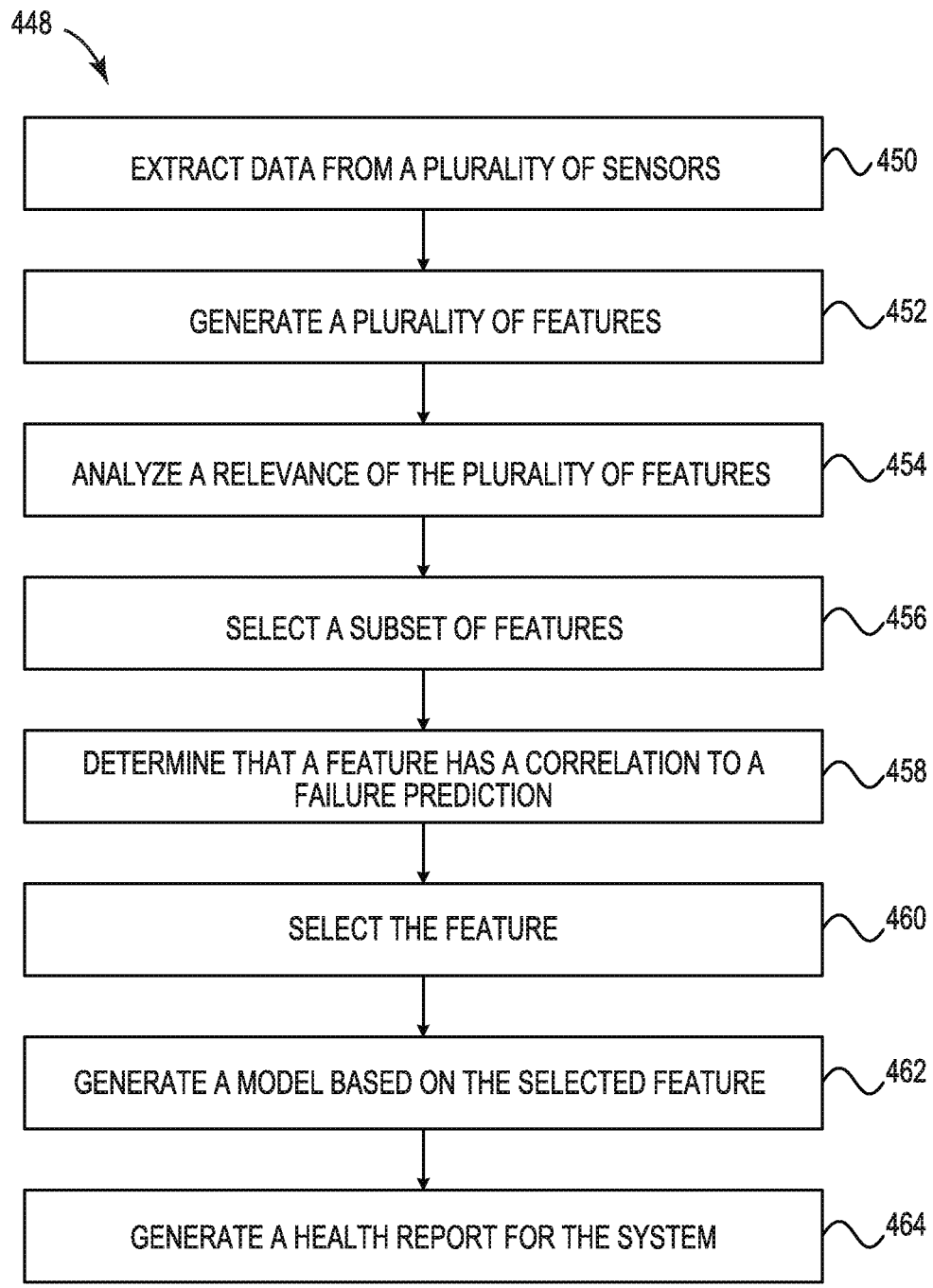
FIG. 4 is an example method for component failure prediction according to the present disclosure.

FIG. 4 is an example method 448 for component failure prediction according to the present disclosure. At 450, method 448 may include extracting data from a plurality of sensors. As described previously, the sensor data may be a historical data record corresponding to a component in a system. The sensor data may be akin to sensor data 332, as shown in FIG. 3. Data extraction at 450 may be akin to component data extraction 334, shown in FIG. 3.

At 452, method 448 may include generating a plurality of features. As describe previously, the features generated may be based on the data extracted at 450. Feature generation at 452 may be performed by feature generator 220, as shown in FIG. 2. Feature generation at 452 may be akin to feature extraction and generation 336, shown in FIG. 3.

At 454, method 448 may include analyzing a relevance of the plurality of features. As described above, the plurality of features may be analyzed using a variety of methods. For example, analyzing the relevance of a feature may including determining whether the feature predicts a selected failure. Based on the determination, a correlation of the feature to the prediction of the selected failure may be calculated.

At 456, method 448 may include selecting a subset of features. As described previously, the subset of features may be selected based on criteria, such as whether the feature corresponds to the component being looked at. At 458, method 448 may include determining that a feature has a correlation to a failure prediction. The feature may have been selected as part of the subset of features at 456.

In some examples, determining that a feature has a correlation to a failure prediction at 458 may include looking at a correlation determined as part of the relevance analysis at 454. In some examples, a determination may be made that a feature has a correlation to a failure prediction that is above a threshold correlation. Based on the determination that the correlation is above a threshold correlation, the feature may be selected at 460.

At 462, method 448 may include generating a model based on the selected feature. As described previously, the model may predict the failure of a component. The model may be generated based on a single feature selected at 460, or the model may be based on multiple features selected at 460. As described above, multiple models may be generated and combined to form a single model for component failure prediction.

At 464, method 448 may include generating a health report for the system. As used herein, a health report refers to a report describing the overall functioning and wellness of a system and its components. A health report may include details about the health of a component, including a prediction that a component is likely to fail. In some examples, generating a health report at 448 may include generating a predicted type of failure for a particular component. Thus, the health report may serve to alert a user that a component is predicted to fail. Further, the health report may tell the user how the component is most likely to fail (e.g. overheating versus a mechanical failure).

When a health report generated at 464 includes a prediction of component failure, method 448 may further include evaluating the health report for an accuracy of the predicted component failure. In some examples, evaluating the health report for accuracy of the predicted component failure may include extracting data associated with the component failure. Extracting data associated with a failure may correspond to extract data instructions 114, shown in FIG. 1. The data associated with the component failure may be extracted by a failure extractor, described previously with respect to FIG. 2.

Once data corresponding to the component failure has been extracted, evaluating the health report may include correlating the extracted data with the health report. As described previously, correlating the data may include determining that the health report included an accurate prediction of component failure. In some examples, correlating the data may include determining that the health report included a correct prediction of component failure but that the prediction was not accurate. For example, the health report may have included a prediction that the component would fail at a different time or for a different reason. In some examples, correlating the data may include determining that health report included no prediction of the component failure. Correlating the extracted data may correspond to correlate data instructions 116, shown in FIG. 1. The data may be correlated with the health report by the failure extractor, discussed in relation to FIG. 2.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature can refer to any number of such elements and/or features.

What is claimed:

1. A non-transitory computer readable medium containing instructions that when executed by a processor cause the processor to:

collect data from a sensor monitoring a component of a system, wherein the component is one of an electrical component and a mechanical component;

analyze a plurality of features, wherein each of the features corresponds to the data collected from the sensor;

determine which of the plurality of features to use to generate failure models of the component based on a correlation to a first failure type, wherein features with a first correlation above a threshold correlation are utilized to generate the failure models and features with a second correlation below the threshold correlation are discarded;

generate a plurality of models to model the first failure type of the component;

assemble the plurality of models into a single model for predicting a failure of the first failure type of the component;

extract data associated with the failure predicted by the single model;

correlate data associated with a detected failure with the single model; and determine when the plurality of features has successfully predicted the failure of the first failure type of the component.

2. The non-transitory computer readable medium of claim 1, wherein the instructions to assemble the plurality of models include instructions to assemble the plurality of models based on a determined range of failures for the component.

3. The non-transitory computer readable medium of claim 1, wherein the instructions to determine which of the plurality of features to be used include instructions to select a portion of the plurality of features based on a determined quantity of features for generating the plurality of models.

4. The non-transitory computer readable medium of claim 1, further comprising instructions to:

predict, based on the single model, the failure of the component; and transmit an alert that the component is predicted to fail.

5. The non-transitory computer readable medium of claim 1, comprising instructions to:

determine whether each of the plurality of features has successfully predicted a failure of the component;

calculate a correlation between each feature and its successful prediction of component failure; and determine a rate at which each of the plurality of features fails to successfully predict component failure.

6. A system, comprising:

a data collector to collect data from a plurality of sensors monitoring a component of a system, wherein the component is one of an electrical component and a mechanical component;

a feature analyzer to analyze a plurality of features based on the data collected from the plurality of sensors;

a feature composer to determine and select which of the plurality of features to use based on a correlation to a failure type, wherein features with a first correlation above a threshold correlation are selected to generate failure models of the component and features with a second correlation below the threshold correlation are discarded;

a model generator to generate a plurality of failure models to model the first failure type of the component based on the selected features;

a model composer to assemble the plurality of failure models into a single failure model for predicting a failure of the failure type of the component by:

receiving an output from the plurality of generated failure models; and combining the output from the plurality of generated failure models into a single output;

an extractor to extract data associated with the failure predicted by the single model; and a correlator to correlate data associated with a detected failure with the single failure model; and determine when the plurality of features has successfully predicted the failure of the failure type of the component.

7. The system of claim 6, further comprising the failure extractor to:

determine that a component failure has occurred;

extract data corresponding to the failed component;

generate association information for the component based on the corresponding data; and provide the association information to the feature generator.

8. The system of claim 6, further comprising the model composer to:

determine an aspect of data represented by each of the plurality of failure models;

analyze a combination of the plurality of failure models to determine a coverage of the aspect by the combination of the failure models;

determine that a combination of the plurality of failure models provides a coverage of the aspect above a threshold; and select the combination of the plurality of failure models.

9. The system of claim 6, further comprising the feature composer to:

determine, based on the analysis of the plurality of features, that a feature has a correlation to a failure that is below a threshold correlation; and discard the feature based on the determination that the correlation is below the threshold correlation.

10. The system of claim 6, further comprising the model generator to:

determine a weight value of each of the plurality of generated failure models;

determine that the weight value of a generated failure model is below a threshold weight value; and discard the generated failure model based on the determination that the weight value is below the threshold weight value.

11. A method, comprising:

extracting data from a plurality of sensors in a system monitoring a component, wherein the component is one of an electrical component and a mechanical component;

generating a plurality of features based on the extracted data;

analyzing a relevance of each of the plurality of generated features;

selecting a subset of the plurality of features;

determining that a feature of the plurality of generated features be used to generate failure models of the component based on a correlation to a failure type, wherein features with a first correlation above a threshold correlation are utilized to generate the failure models and features with a second correlation below the threshold correlation are discarded;

generating a plurality of models to model the first failure type of the component;

assembling the plurality of models into a single model for predicting a failure of the first failure type of the component;

extracting data associated with the failure predicted by the single model;

correlating data associated with a detected failure with the single model; and determining when the plurality of features has successfully predicted the failure of the first failure type of the component.

12. The method of claim 11, further comprising evaluating the health report for an accuracy of predicted component failures.

13. The method of claim 12, wherein evaluating the health report includes:

extracting data associated with component failures; and correlating the data associated with component failures with the health report.

14. The method of claim 11, wherein generating the health report includes generating a predicted type of failure for a particular component.

15. The method of claim 11, wherein analyzing the relevance of a feature comprises:

determining whether the feature predicts a selected failure; and calculating the correlation of the feature to the prediction of the selected failure.

* * * * *